United States Patent [19]
Bartlett

[11] Patent Number: 4,499,549
[45] Date of Patent: Feb. 12, 1985

[54] DIGITAL COMPUTER HAVING ANALOG SIGNAL CIRCUITRY

[75] Inventor: Peter G. Bartlett, Davenport, Iowa

[73] Assignee: Automation Systems, Inc., Eldrige, Iowa

[21] Appl. No.: 392,374

[22] Filed: Jun. 25, 1982

[51] Int. Cl.[3] .......................... G06J 1/00; G06F 3/04

[52] U.S. Cl. .................................. 364/601; 364/602; 364/900

[58] Field of Search ... 364/600, 601, 602, 900 MS File

[56] References Cited

U.S. PATENT DOCUMENTS

| | | | |
|---|---|---|---|
| 3,243,582 | 3/1966 | Holst | 364/900 |
| 3,493,731 | 2/1970 | Lemonde | 340/347 |
| 3,761,689 | 9/1973 | Watanabe et al. | 340/166 R |
| 3,898,625 | 8/1975 | Lamden | 364/600 |
| 4,055,793 | 10/1977 | Bartlett | 323/22 SC |
| 4,057,711 | 11/1977 | Asthaner et al. | 364/600 |
| 4,063,121 | 12/1977 | Bartlett | 307/311 |
| 4,178,634 | 12/1979 | Bartlett | 364/900 |
| 4,190,898 | 2/1980 | Farnsworth et al. | 364/90 |
| 4,213,174 | 7/1980 | Morley et al. | 364/900 |
| 4,275,455 | 6/1981 | Bartlett | 364/900 |

OTHER PUBLICATIONS

"Digitally-Controlled Multipurpose Analog Circuit," Estebas, D. J., IBM Technical Disclosure Bulletin, vol. 12, No. 5, Oct. 1969, pp. 664-666.

*Primary Examiner*—Jerry Smith
*Assistant Examiner*—John R. Lastova
*Attorney, Agent, or Firm*—Woodard, Weikart, Emhardt & Naughton

[57] ABSTRACT

A combination of a programmable logic controller with analog circuitry. The analog circuitry includes a summation point to which several items are coupled. Analog inputs are selectively coupled to the summation point through analog switches. Also, the output of a digital to analog converter couples to the summation point. Still further, the analog output for the controller is obtained from a sample and hold circuit which has its input connected to the summation point and which includes means for outputting the analog value at its output back to the summing point. Even still further, a comparator input couples to the summation point. The arrangement provides for direct processing of analog information either by direct output of analog processed analog data or by obtaining one bit data from the comparator which represents whether a threshold has been reached by the analog data. Digital processing of the analog data may be accomplished, if necessary by using the circuit to convert from analog to digital and back again. The equipment is designed so that digital or analog, input or output cards may be inserted into any of the I/O positions without rewiring.

29 Claims, 25 Drawing Figures

INVERTING AND SUMMING

INVERTED INTEGRATION

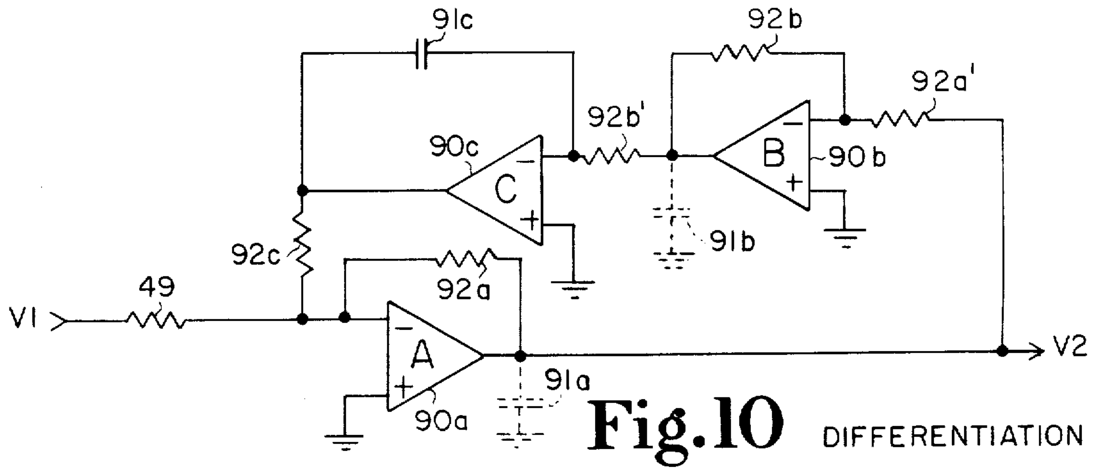
Fig.10 DIFFERENTIATION
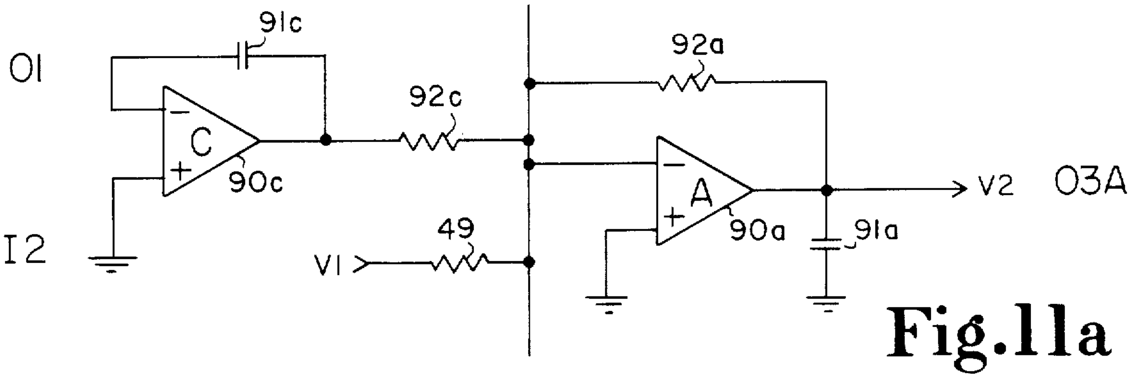
Fig.11a
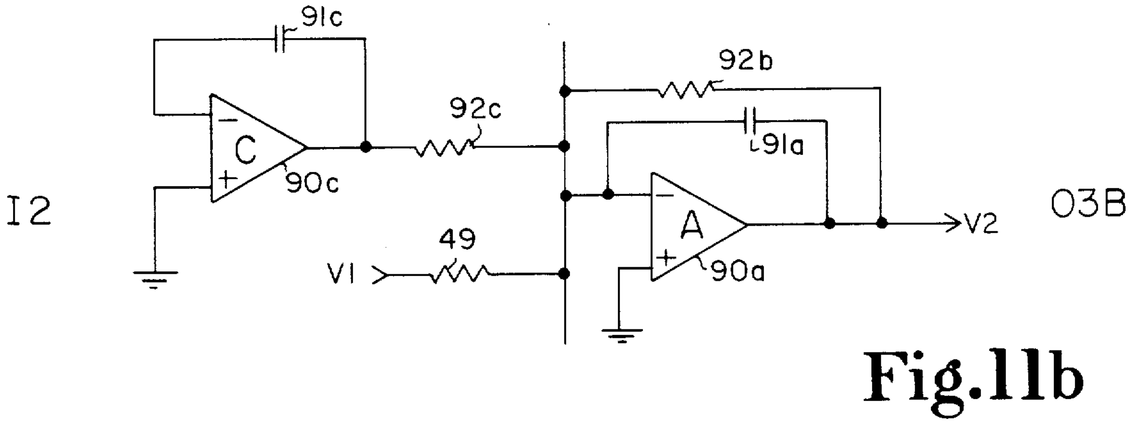
Fig.11b

DIGITAL COMPUTER HAVING ANALOG SIGNAL CIRCUITRY

The invention relates to a hybrid computer having both digital and analog signal circuitry.

Several methods to deal with the use of digital processors in connection with analog data have been tried. U.S. Pat. No. 4,190,898 to Farnsworth discloses a digital processor combined with circuitry to interface with analog inputs and analog outputs. Such a system sequentially samples inputs and sequentially converts them into digital signals which are then available for conventional digital processing or storage. The digital output information is sequentially strobed into a plurality of sample and hold circuits to provide the analog output signals. Conventional data processing is done digitally. This type of processing of analog signals is common.

U.S. Pat. No. 4,213,174 to Morley et al. discloses a combination of a programmable one bit logic controller having circuitry to interface with analog input signals. With this circuit, individual analog input voltages are automatically scaled by the controller into appropriate units so that the user can set limit points in terms of degrees, pounds per square inch, minutes, and other famlliar units. This simplifies the control program, and thus makes it easy to understand and maintain the control logic. Most of the time this controller does not determine the actual voltage of the analog input but merely whether or not the voltage ot the input exceeds the desired preset value established by the software with regard to the preset value selected by the user. In such cases, the digital signal representing the preset value is converted by a digital to analog converter to an analog signal. This signal is then compared to the analog input signal in question. The output of the comparator is a one bit signal indicating whether the analog input signal is higher or lower than the generated analog reference signal. (By incrementing the reference signal and detecting the change of state of the comparator, the circuit can function to convert an analog signal to a digital signal.)

U.S. Pat. No. 3,493,731 to Lemonde discloses a combination of a multibit digital and an analog system in which addressable analog input signals may first be combined and then converted to a digital signal. In operation of the hybrid system under the control of the digital program, the digital system communicates across the hybrid interface to select the particular operational modes of the analog system, to select and provide appropriate resistive values of the potentiometers representing the coefficients of the particular equations involved as well as to supply the initial conditions values with which the computation is to start.

U.S. Pat. No. 3,761,689 to Watanabe discloses an analog and digital computer using an automatic connection type switch matrix to establish connections among analog operational devices. Similarly, U.S. Pat. No. 3,243,582 to Holst discloses a digitally controlled analog computer.

In many of these systems, substantial computing delay occurs because of the need for conversion of analog data into digital form. The delay may make some real-time calculations difficult or impossible. Additionally some of these systems can handle only one analog input at a time or require several analog to digital converters to handle several analog inputs. In some cases the cost of the converters may approach or even exceed the cost of the computer.

SUMMARY OF THE INVENTION

The invention relates to a hybrid computer having both digital and analog signal circuitry. Various aspects of the hybrid computer are novel and provide for improved operation. While the actual nature of the invention covered herein can be determined only with reference to the claims appended hereto, certain features which are characteristic of the preferred embodiment of the novel controller disclosed herein can be described briefly.

One aspect of the invention relates to the design of a hybrid computer so that various combinations of different interface modules can be inserted without rewiring. Typical interface modules would include an analog input card, an analog output card, a digital input card and a digital output card. In the preferred embodiment of the invention, any one of these cards can be inserted into any one of the I/O interface positions. This allows for a great improvement of the flexibility of use of the computer by the customer with changing circumstances.

The preferred embodiment of the invention is an improvement upon the programmable logic controller shown in U.S. Pat. No. 4,178,634 and the corresponding divisional U.S. Pat. No. 4,275,455 to Bartlett. The improvement allows the programmable controller to do analog calculations in addition to the digital calculations done in the earlier patented circuitry. In these patents, the input and output interfacing circuitry was directed towards one bit digital signals (see also Bartlett U.S. Pat. Nos. 4,055,793 and 4,063,121). However, many uses for programmable controllers require the interfacing with analog data. The conventional approach to the problem of analog data has been simply to first convert each channel, sequentially or in parallel to digital signals, and to thereafter digitally process the signals. The processed output would then be converted, either sequentially or in parallel to analog signals. The analog to digital converters for the inputs would be separate from the circuitry for converting the processed output back into analog circuitry. The programmable controller shown in the Bartlett patents had no means for processing analog data without separate conversion to a digital signal. The controller is provided with analog computing functions merely by the addition of two wires (analog ground and analog signal bus) common to the input/output card positions and by insertion of analog processing cards into those positions.

A programmable logic controller, as used herein, is meant to refer to a digital computer having one bit Boolean logic instructions which instructions include an "AND" or "OR" instruction for use with a one bit accumulator. Án instruction set used in a prior art controller is set forth in U.S. Pat. No. 4,178,634 to Bartlett, and that patent is hereby incorporated into this application by reference. Such a controller has input and output address lines and a digital data bus.

While the description of the invention will be in the context of a programmable controller, the scope of the invention as set forth in certain of the claims is by no means limited thereto. The invention has broad application to analog computers, generally, as well as to a hybrid computer which contains analog computing functions and digital computing functions which are not performed by a programmable logic controller.

With the preferred embodiment of the invention, analog data can be rapidly handled with a minimum of hardware components. The arrangement provides for direct processing of analog information either by direct output of analog processed analog data or by obtaining one bit data from a comparator which represents whether a threshold has been reached by the analog data. Digital processing of the analog data may be accomplished, if necessary by using the circuit to convert from analog to digital and back again.

BRIEF DESCRIPTION OF THE DRAWINGS

FIGS. 5*a* and 5*b* align along the edges when FIG. 5*a* is placed to the left of FIG. 5*b*.

FIG. 10 illustrates a more complex analog operation of differentiation, which must be done in sequential steps.

FIGS. 11*a* through 11*e* represent the sequence of steps which are periodically followed to accomplish the operation of FIG. 10.

DESCRIPTION OF THE PREFERRED EMBODIMENT

Figure 1:
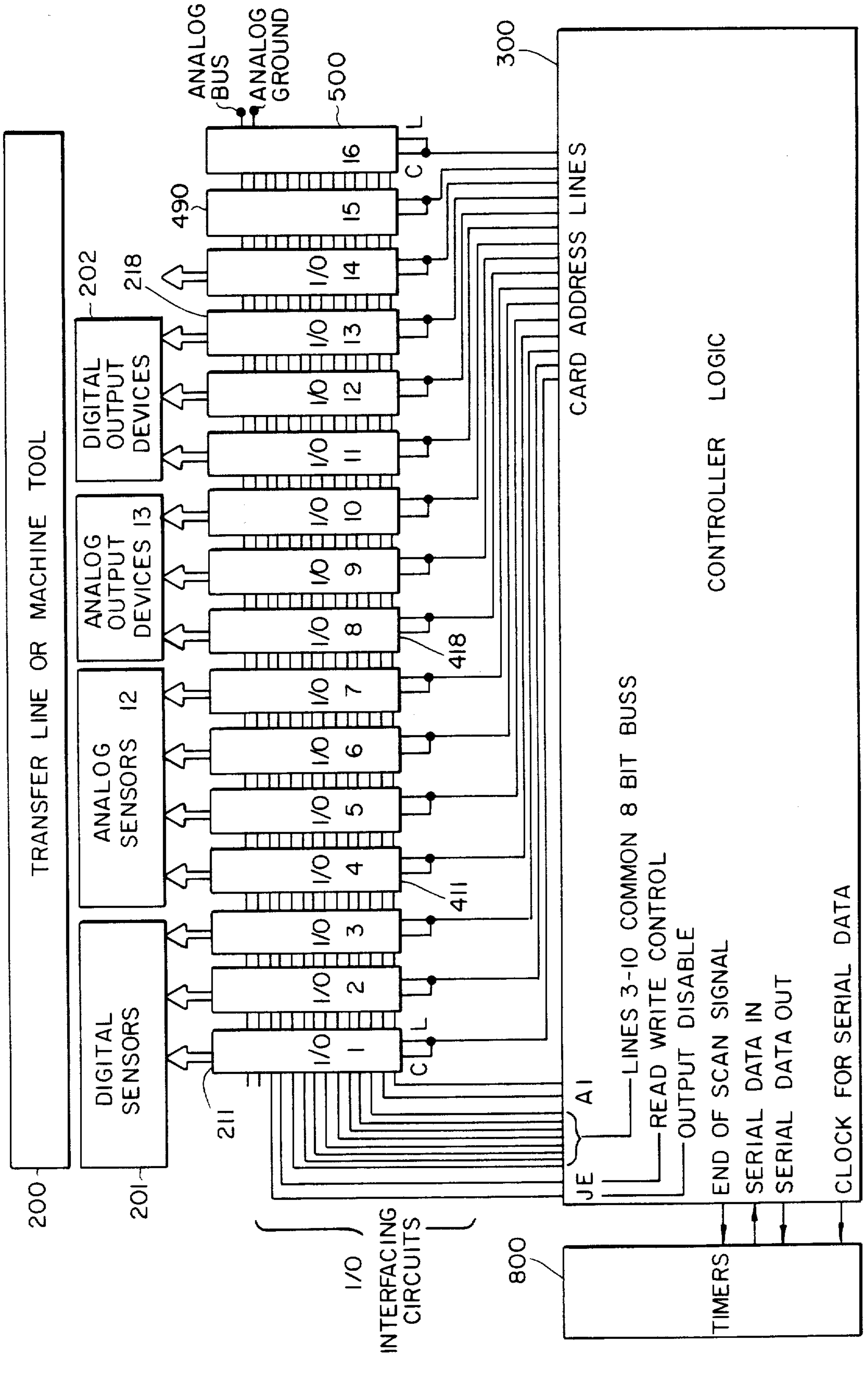
FIG. 1 illustrates the preferred embodiment of the invention in block form, and shows the wiring to the interface cards.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is illustrated a transfer line or machine tool 200 having associated with it digital output devices 202, digital sensors 201, analog output devices 13 and analog sensors 12. An example of an analog sensor is a thermistor and an example of an analog output device would be a chart recorder or a meter. As reflected in U.S. Pat. No. 4,178,634, digital output interfacing circuit 218 controls the digital devices and digital input interfacing circuit 211 receives the signals from the digital sensors 201.

Analog signal circuits present in I/O positions 4–10 and 15 and 16 receive analog signals from the analog sensors and provide analog signals to the analog output devices 13, respectively. I/O positions 4–7 include analog input cards 411. I/O positions 8–10 include analog output cards 418. Position 15 includes an analog output card 490 identical to cards 418 but it does not connect to any external devices. It is merely used as supplementary analog memory. The function of memory card 490 could alternatively be accomplished by a card especially made for that purpose, simply by having one output circuit as in the conventional output cards and by having analog switches to substitute various capacitors in that circuit for additional memory positions. Position 16 includes an analog function circuit 500 which does not connect to any external devices, but which provides for certain analog functions not provided for in the other cards. While the connection to external devices is not shown in the drawing for positions 15 and 16, it is contemplated that these may be connected to external terminals in the same fashion as the other positions so that a full complement of digital cards could be used if no analog functions were desired.

Controller logic 300 provides the data, address and control for the digital interfacing circuits 211 and 218 and for the analog signal circuits 411, 418, 490 and 500. All of the I/O positions are wired in the same fashion so that digital or analog, input or output cards can be placed in any slot.

Figure 2:
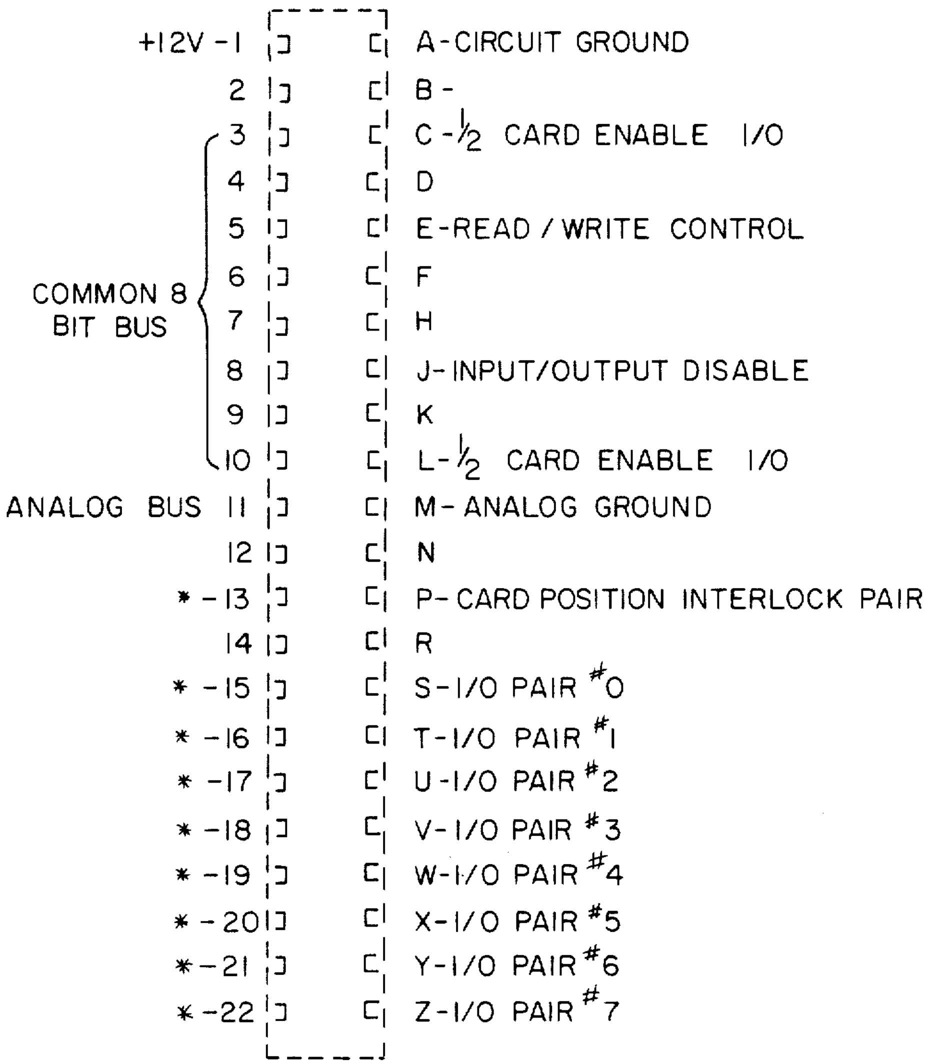
FIG. 2 is a diagram of a printed circuit card edge connector into which printed circuit cards, such as in FIGS. 3-5, are inserted in positions 1 through 16 of FIG. 1.

Referring to FIG. 2, there is illustrated the printed circuit card edge connector into which input or output interfacing circuit cards such as in FIG. 1 are inserted.

This printed circuit card edge connector has connections identical to those disclosed in U.S. Pat. No. 4,178,634 except that the previously unused contact positions 11 and M now have connected to them, an analog bus and an analog ground, respectively. These connections are common to all of the edge connectors for I/O positions 1 through 16.

Figure 3:
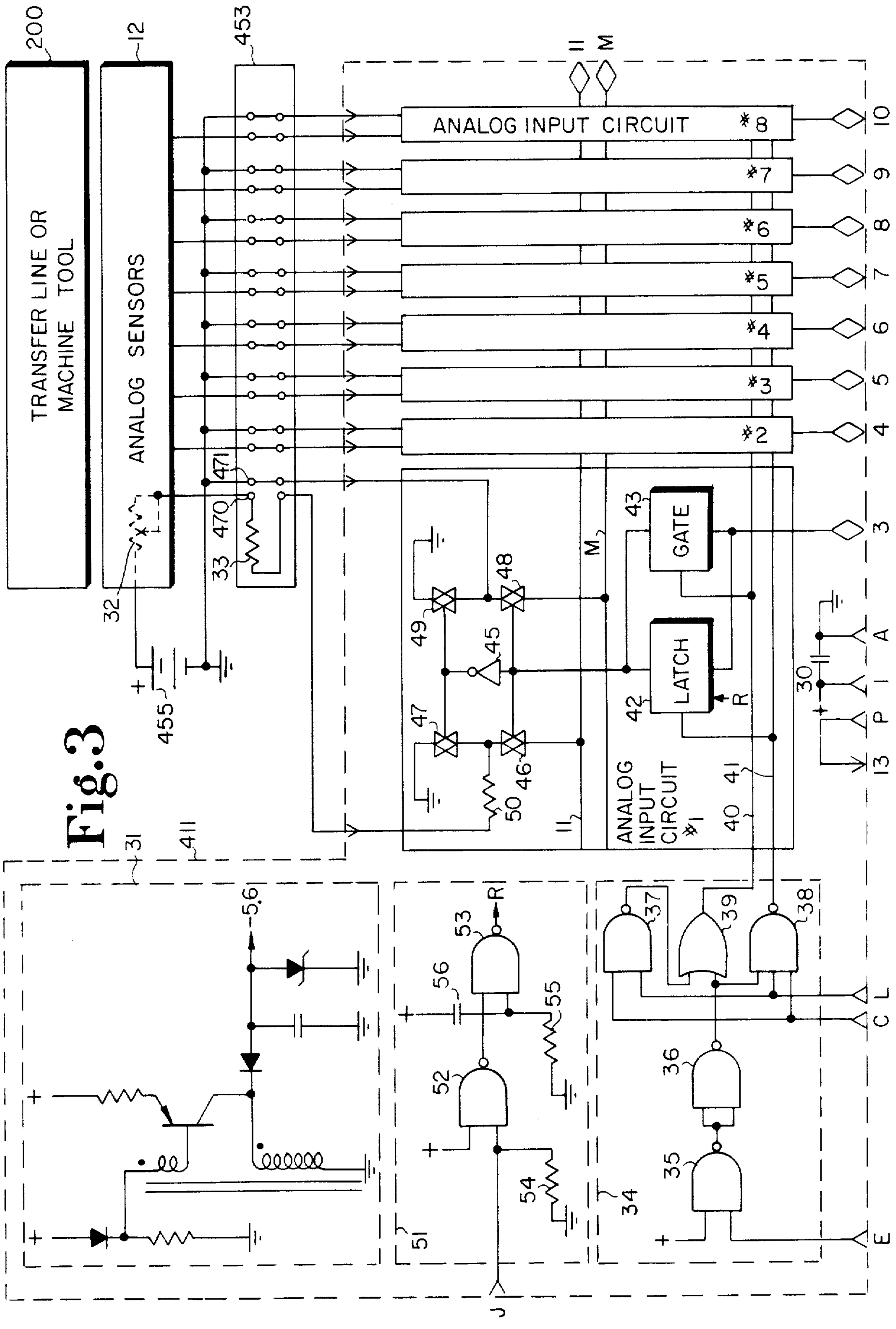
FIG. 3 illustrates the details of an analog signal input card of the invention of FIG. 1 as are found in I/O positions 4 through 7.

Referring more particularly to FIG. 3, there is illustrated an analog input card 411 such as is inserted into I/O position 4 of FIG. 1. The printed circuit edge card connections are designated around the edge of the dotted line portion representing the card. These include letter designated connection terminals A, C, E, J, L, M, P and additionally include numbered connections 1, 3–11, and 13, which are designated. In addition, the I/O pairs are illustrated. All of these printed circuit edge card connections are placed on the card in a fashion to mate with the edge card connector of FIG. 2. Since the card is provided only with positive voltage and a ground reference through terminals 1 and A, filtered by capacitor 30, a −5.6 volt supply 31 is used. (The −5.6 volt supply is optional on this card, depending upon the need in connection with the analog switches 46-49.) As illustrated in FIG. 3, an analog sensor such as potentiometer 32 provides, in connection with a battery 455, a varying analog signal for processing by the computer. External connections to the computer are made at a terminal block 453 containing terminals such as 470 to which the potentiometer 32 is connected and terminal 471 to which the grounded terminal of the battery is connected. The positive terminal of the battery then connects to the other side of potentiometer 32. An externally mountable resistor 33 has been placed in series with the path to the computer for purposes of scaling the value. This is shown for illustrative purposes only, since most scaling would be done by the analog computer itself. An alternative external resistor placement in certain applications would be between terminals 470 and 471. In the preferred embodiment, all of the analog processing is done in relationship to a single analog summing node and a corresponding analog ground. The analog summing node connects to edge connector 11 and the analog ground to edge connector M. This node and ground are common to all of the analog input and output cards 411 and 418, as well as the analog function card 500 and analog memory card 490.

On each input card 411, connection of the analog signals from the external sensors is made by eight separate analog input circuits which are controlled by the eight bits of the data bus when the input card is enabled. Each of the eight analog input circuits are identical to each other. A card is enabled by the presence of a 1 on both the C and the L card enable lines. The state of read/write control line E determines whether an enabled card will have the on/off values written onto, or merely read by the digital controller which programs the analog functions. Card enable circuitry 34 includes a NAND gate 35 and a second NAND gate 36 which control the generation of read commands on line 40 and write commands on line 41. These are generated through rather straightforward logic by NAND gates 37 and 38 and OR gate 39. A simplified form of the logic of card enable circuitry 34, as shown in card enable circuitry 64 of FIG. 4, could alternatively be used. Since the data bus connecting to terminals 3 through 10 is bi-directional, an arrangement of latch 42 and gate 43 allow data from the data bus to be latched to provide a permanent record of the state of the analog input, and gate 43 allows that state to be transmitted back to the data bus when an appropriate read command is received on line 40. The switching of the analog signals is accomplished with a Motorola triple 2-channel analog multiplexer/demultiplexer number MC14053. It is represented functionally by inverter 45 controlling four analog switches 46, 47, 48 and 49. When the data on line 3 is high, and the card is enabled through high signals on lines C and L and there is a high signal on the read/write line E, then the output of latch 42 will go high, turning on analog switches 46 and 48. When analog switch 46 is turned on, the external analog signal from resistor 33 couples through resistor 50 to the analog bus 11. At the same time, the corresponding ground connection for the external input couples to the analog ground M through analog switch 48. Depending upon the state of the various lines of the common 8 bit bus, any combination of inputs may be connected to the analog bus at the same time. Due to the action of inverting amplifier 45 which connects from the output of latch 42 to the analog switches 47 and 49, a zero output of latch 42 will cause the analog input signal and its corresponding ground to be connected directly to ground. Consistent with the design of the I/O circuits in U.S. Pat. No. 4,178,634, the analog version also has an input disable circuit 51. When an input/output disable signal J is received, the action of NAND gates 52 and 53 and their corresponding resistors 54 and 55 produce a reset signal R. Capacitor 56 functions to place a high on one input of NAND gate 53 only when the power supply is first turned on. The R output of this NAND gate 53 is connected to latch 42 and the corresponding latches in the other 7 analog input circuits to insure that all of the analog inputs are turned off when the power supply is first turned on.

Figure 4:
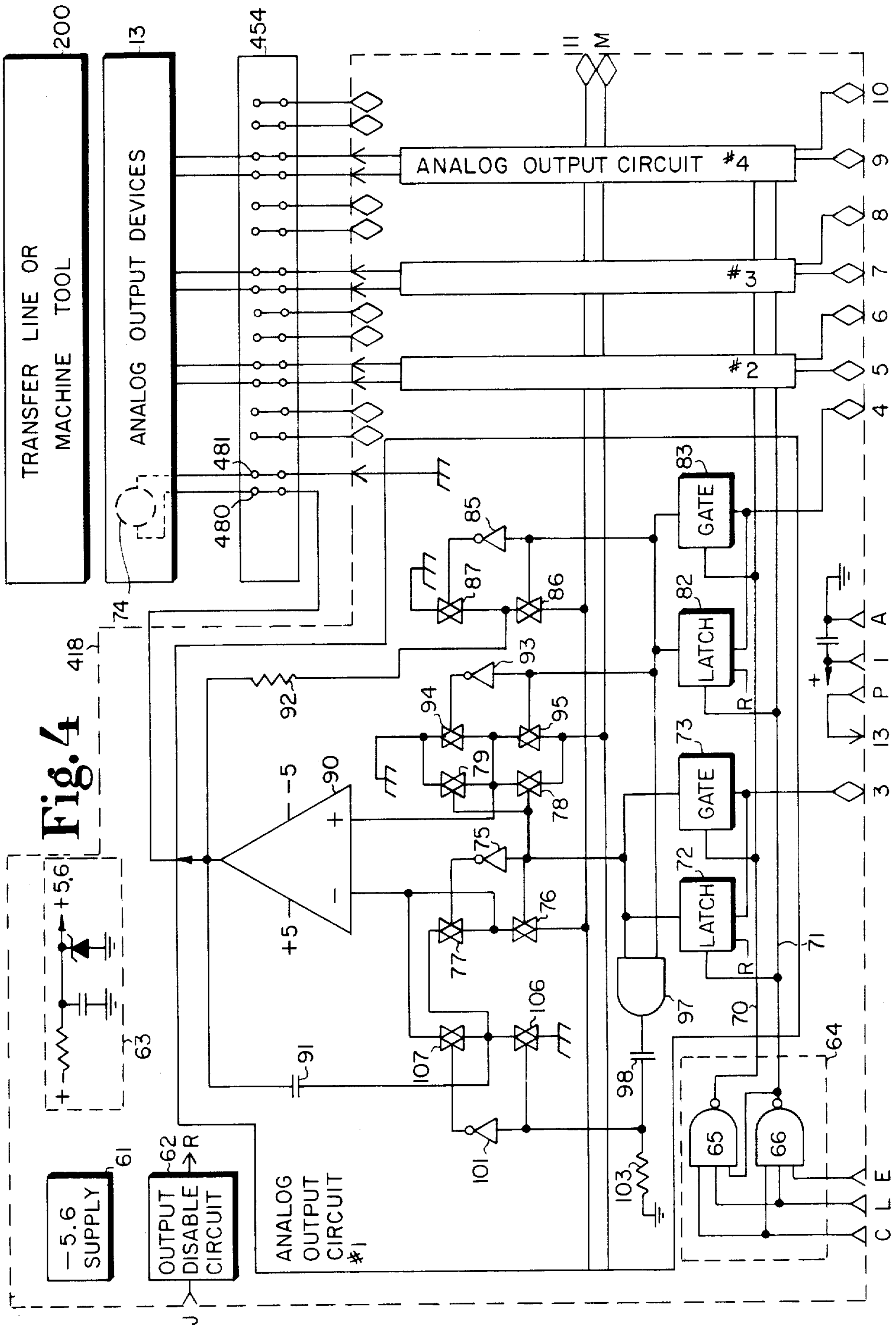
FIG. 4 illustrates the details of an analog signal output card of the invention of FIG. 1 as are found in I/O positions 8 through 10.

Referring now more particularly to FIG. 4, there is illustrated an analog output card 418. A −5.6 volt supply 61 is identical to the −5.6 volt supply 31 of FIG. 3. The card also has an output disable circuit 62 corresponding to the input disable circuit 51 of FIG. 3. A +5.6 volt supply 63, necessary for operational amplifiers used in the output circuit, is of conventional design. Since the functions of an analog output card of the invention are more complex than a corresponding digital output card, two bits of information are needed for each output circuit. The simplest way of designing an output card with this constraint is simply to have connections to only half of the output positions and this is what has been done in this instance. Another alternative, not shown, would be to provide both voltage and current outputs for each output circuit, thereby using all of the terminal connections. It would, of course, be another alternative to provide a double byte of data to the card (if space is available to get a sufficient number of components on the card) to perform the analog output functions for all eight output pairs of wires. Card enable circuit 64 including two 3-input NAND gates 65 and 66 are connected in a conventional fashion from the C, L and E lines to provide a read signal on line 70 and a write signal on line 71 for the card.

Analog output circuit #1 will be described in detail. Analog output circuits #2-4 are identical in configuration. A terminal block 454 having terminals such as terminals 480 and 481, are used for making connections to external analog output devices such as meter 74. The data from line 3 can be latched in latch 72 and read back through gate 73. Similarly, the data from line 4 can be latched in latch 82 and read back through gate 83.

When the output of latch 72 is high, the action of latch 72 and inverting amplifier 75 on analog switches 76 through 79 is to turn on analog switches 76, 78, and 79. This connects the minus input of operational amplifier 90 to the analog signal bus 11 and the positive input to the analog ground M and to circuit ground. The connections to circuit ground are indicated by an "earth" designation to differentiate from the more conventional grounding which is found in many digital systems. Grounds having the "earth" designation are intended to be star grounds, with all grounds connecting to the same point, to minimize difficulties with ground loops. The output of latch 72 is high during the integrate and amplify modes of operation.

The output of latch 72 is low during the hold and internal signal input modes of operation. When the output of latch 72 is low, then the positive input of operational amplifier 90 connects to analog ground M or to circuit ground depending upon the state of latch 82. The negative input of operational amplifier 90 connects through analog switch 77 to capacitor 91, which connects at its other end to the output of operational amplifier 90. In this configuration, the operational amplifier will hold the value of the voltage across capacitor 91 and provide it at its output.

A resistor 92 couples the value of the output of operational amplifier 90 either to ground through analog switch 87 (hold or integrate mode) or back to the analog signal bus through analog switch 86 (internal signal input or amplify mode), depending upon the state of the output of latch 82 and inverter 85 controlling the analog switches 86 and 87.

As a further consideration of the problem of grounding, when the output of latch 72 is low during the hold and internal signal input modes of operation, the positive input of operational amplifier 90 needs to be connected to circuit ground for the hold mode and to the analog ground M for the internal signal input mode of operation. The output of latch 82 controls analog switch 95 to connect the positive input to the analog ground bus in the internal signal input mode. An inverting amplifier 93 which has its input connected to the output of latch 82 controls analog switch 94 to connect the positive input to the circuit ground in the hold mode. Operation of the computer of this invention is premised upon the fact that only one amplifier with feedback will be connected to the analog signal bus at a time. Since it is desired that there be only one internal ground at a time (to minimize the problem of ground loops), the grounding point has been chosen to be at the input of the one amplifier which is connected in a mode with feedback. For the preferred circuit operation, the operational amplifiers used in this invention are MOSFET input 3160 amplifiers adjusted with external potentiometers connected to pins 1, 4 and 5 in conventional fashion (not shown) to eliminate offset voltage error.

AND gate 97 has inputs which connect to the outputs of latches 72 and 82. The output of AND gate 97 couples through capacitor 98 and inverter 101 to control analog switches 106 and 107. A resistor 103 serves to bring the voltage at the input of inverter 101 to ground after a period of time. A problem occurs when operational amplifier 90 is connected in an amplifying configuration to the analog signal bus. Initially upon connection, substantial amounts of current flow into capacitor 91. So that this does not interfere with the operation of the operational amplifier, analog switch 106 is turned on and the current through capacitor 91 goes to ground. After a time determined by the time constant of capacitor 98 and resistor 103, analog switch 106 opens and analog switch 107 closes connecting capacitor 91 to the negative input of the operational amplifier. This delayed connection of capacitor 91 prevents the large currents flowing through the capacitor from interfering with the output values when the operational amplifier is first connected to the analog bus and allows for an exact value to be achieved for storage by the capacitor once the value is very nearly achieved.

Figure 5A:
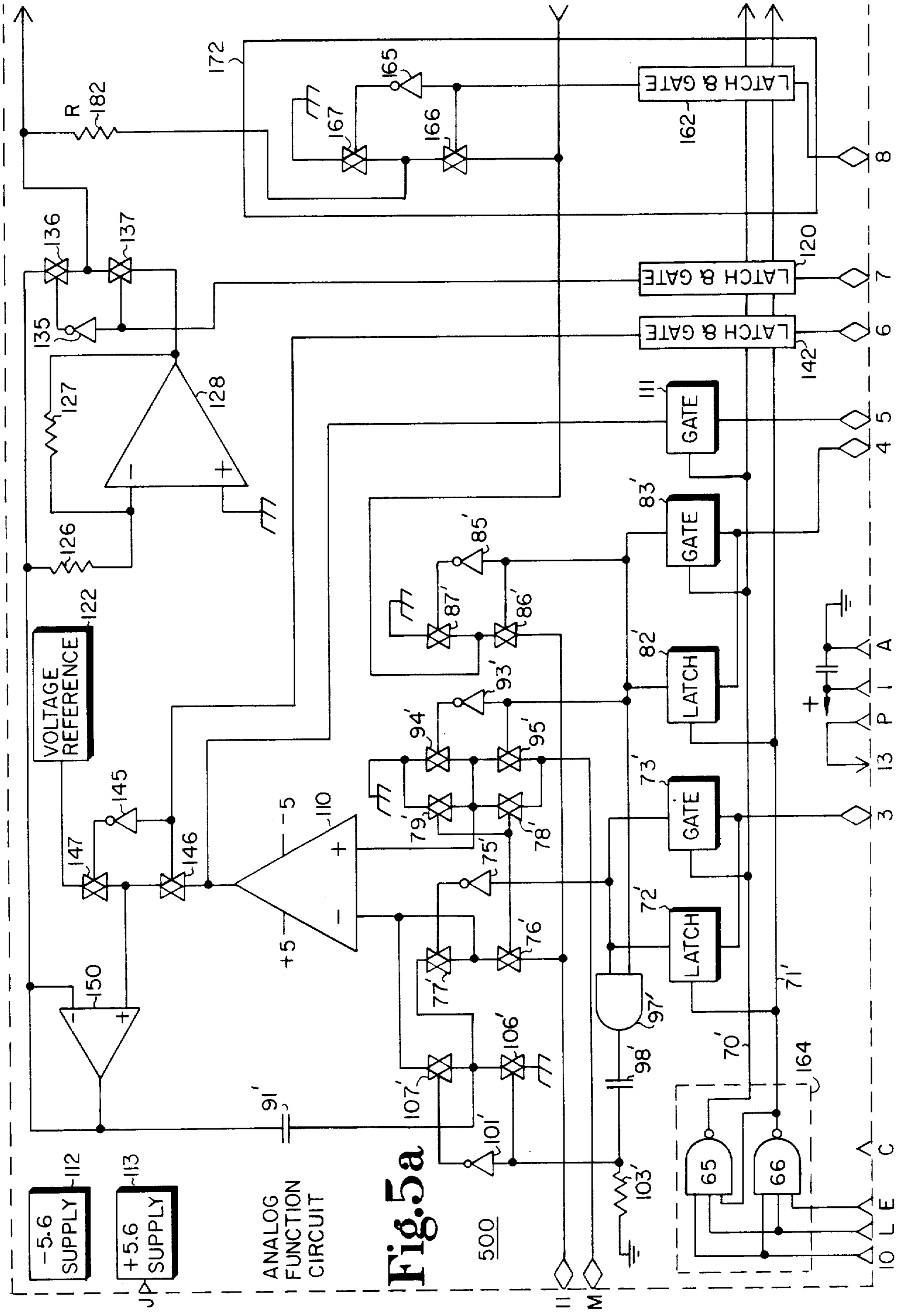
FIGS. 5*a* and 5*b* are a diagram of an analog function card to be inserted into the edge connector of FIG. 3 in position 16 of FIG. 1.
Figure 5B:
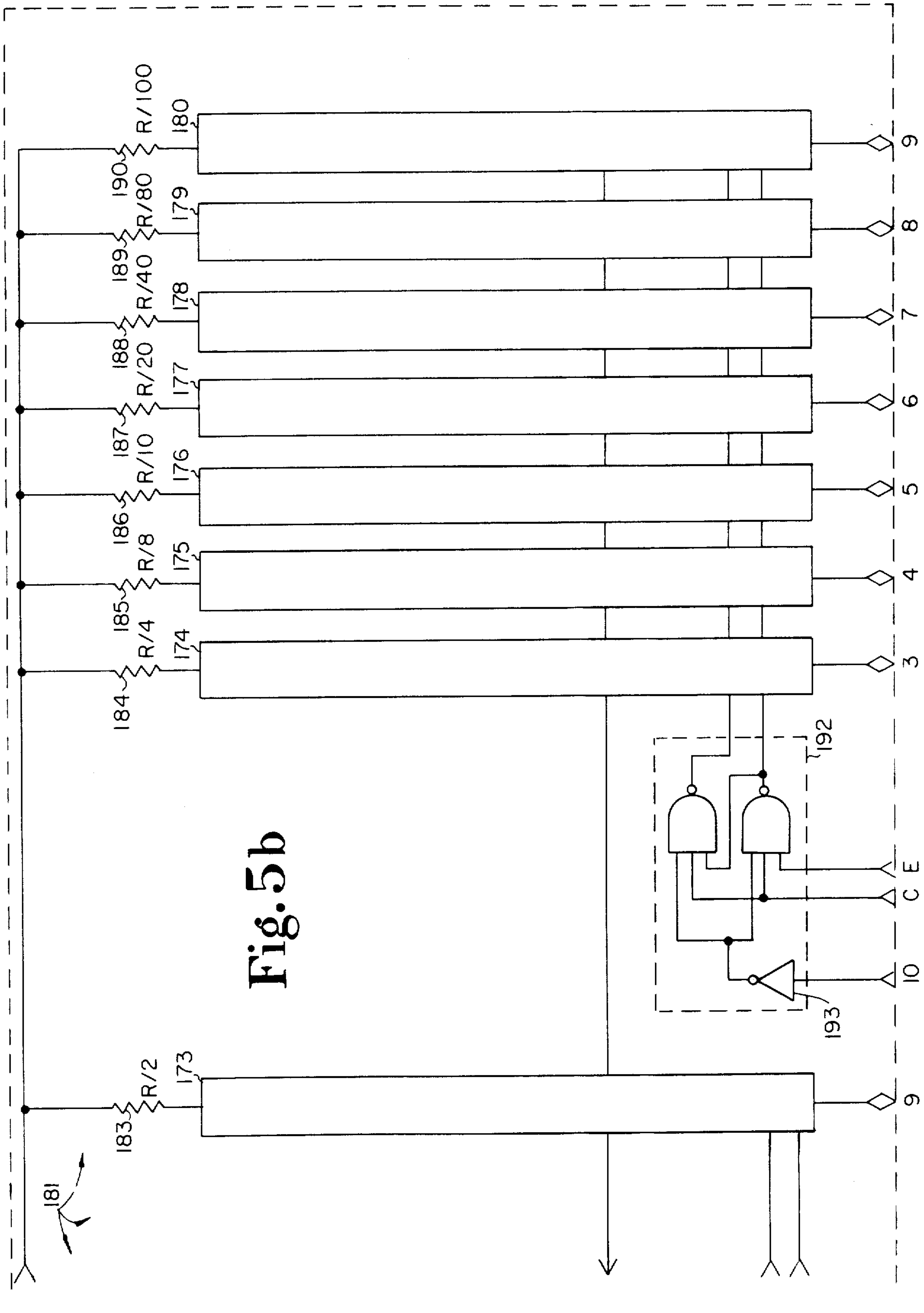

Referring now to FIGS. 5*a* and 5*b*, analog function circuit 500 is illustrated in two separate sheets which can be laid side-by-side. In FIG. 5*a*, there are a −5.6 volt supply 112 and a +5.6 volt supply 113 which are identical to the corresponding supplies 61 and 63 of FIG. 4. Card enable circuit 164, is very similar to the card enable circuit 64 of FIG. 4 except that data bus line 10 is used with lines C and E so that a double byte of data can be obtained if desired. Operational amplifier 110 is identical to operational amplifier 90 of FIG. 4. Similarly, many of the items associated with operational amplifier 110 are the same in operation and function as the corresponding items associated with operational amplifier 90. Therefore, the same item numbers are used to designate those corresponding items except that they are followed with a prime indication. When operational amplifier 110 is connected as a comparator, its one bit digital output is available for coupling through gate 111 to the data bus of the digital controller. This is the sole digital output from the analog processing portion of the invention which can be utilized by the digital processing of the digital controller.

The analog function circuit of FIGS. 5*a* and *b* differs from the analog output card of FIG. 4 in several respects. First, it contains a selectable reference voltage. Second, it provides a selectable inverted or non-inverted signal. Third, instead of the single feedback resistor 92, there is a ladder network 181 of resistors 182–190 which are binary weighted in value. The resistor ladder values range from R to R/100. This compares with the standard feedback resistor such as 92 and the standard input resistor such as 49 which are a value of R/10. With this range of values, operational amplifier 110 can be made to multiply or divide with ease. By applying the reference voltage through this ladder network to the analog bus, an amplifier in an analog output circuit can also be affected.

While for purposes of clarity there is illustrated herein a resistor ladder network of 9 discrete resistors, it is contemplated that a 3½ bit BCD Monolithic CMOS digitally controlled potentiometer such as Analog Devices AD 7525 would be appropriate. As an alternative to the double byte approach disclosed herein, the eight bit bus could be divided into two groups of four bits and used with a 16 bit, 4×4 register. The first group of four bits would consist of one bit for comparator output, one bit to reset tne register, and 2 bits for a one-of-four register select. The second group of four bits, in the home position of the register, would have one bit for the most significant value resistor, one bit for +/− control, and 2 bits for mode select (hold, internal signal input, reterence voltage, and amplify). The four bits from each of the other three positions of the register could be used for the remaining 12 resistors.

Data input through line 7 is handled by a latch and gate combination 120 identical to that of latch 72′ and gate 73′. The output of the latch portion of latch and gate combination 120 controls the polarity of signals to the resistor ladder network 181, including resistors 182–190 and resistor switching circuits 172–180. Equal value resistors 126 and 127 couple to and around the negative input of operational amplifier 128 to provide a negative voltage equal and opposite to the input voltage from the output of buffering operational amplifier 150. A high signal from latch and gate combination 120 will cause analog switch 137 to turn on and analog switch 136 to turn off. This inverts the signal to resistor ladder network 181.

A precision voltage reference 122 (Teledyne Semiconductor 9495) outputs a five volt reference signal. Data input through line 6 is handled by a latch and gate combination 142 identical to that of latch 72′ and gate 73′. The output from the latch portion of latch and gate combination 142 through inverter 145 determines whether the output of operational amplifier 110 connects through analog switch 146 to operate in a fashion similar to the analog output circuits or if the reference voltage couples through analog gate 147 to the resistor network and the operational amplifier 110 converts to a high gain comparator mode of operation. Operational amplifier 150 is provided to assure that there is sufficient current available to drive the resistor ladder network as well as to charge capacitor 91' in the appropriate circuit configurations.

A resistor switching circuit 172 includes latch and gate combination 162 identical to that of latch 72' and gate 73' to retain data from line 8 of the data bus. The output from the latch portion of latch and gate combination 162 through inverter 165 determines whether the resistor 182, with a value of R, connects through analog switch 166 to the common side of the ladder network 181, or to ground through analog switch 167. Resistor 182 is connected between the output of the operational amplifier 110 (as buffered by operational amplifier 150 and possibly inverted by operational amplifier 128) to the analog signal bus 11 when the output of the latch portion of latch and gate 162 is high and the output of latch 82' is high. When the output of the latch portion of latch and gate 162 is low, resistor 182 simply connects to ground so that the loading on the operational amplifiers 150 or 128 is not affected by the change.

Referring more particularly to FIG. 5*b*, there are a series of resistor connecting circuits 173 through 180 which operate in identical fashion to the resistor connecting circuit 172 and resistor 182. In order to allow a double byte of data, a second card enable circuit 192 is provided with an inverter 193 to invert the logic level of the data on line 10. Card enable circuitry 192 is otherwise identical to that of card enable circuit 164. While FIG. 5*b* shows duplicate external connections for purposes of clarity, actually, each card has only one external connection. The interconnects within the card have been avoided for purposes of clarity.

Figure 6A:
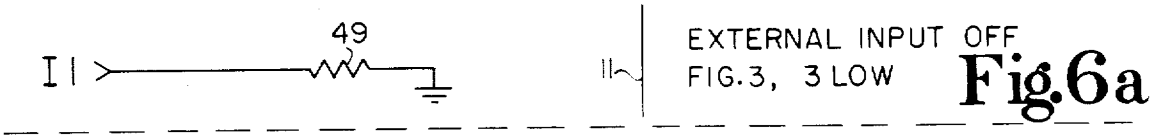
FIGS. 6*a*–*d* illustrates in abbreviated form the resultant connection (external input on and external input off) achieved with the input card of FIG. 3 and two of the resultant connections (hold and internal input on) achieved with the output card of FIG. 4.
Figure 6B:
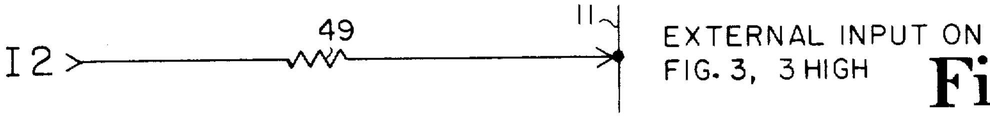

Referring more particularly to FIGS. 6*a*–*b*, there are illustrated in abbreviated form, the resultant connections for the two conditions of an input with the input card of FIG. 3 . It can be observed that an input is either grounded or connected to the single analog signal bus 11 used in the analog portion of the computer. For purposes of clarity, the corresponding ground connections in the following descriptions are not considered. Also, for purposes of clarity, in connection with further discussions of operation, designations have been assigned to the various simplified connection diagrams. When the external input is off, as in FIG. 6*a*, the designation of I1 is used. This configuration is obtained by writing onto an analog input card 411 (as shown in FIG. 3) with data line 3 low. When the external input is on, as in FIG. 6*b*, the designation 12 is used. This configuration is obtained by writing onto an analog input card 411 (as shown in FIG. 3) with data line 3 high.

Figure 6C:
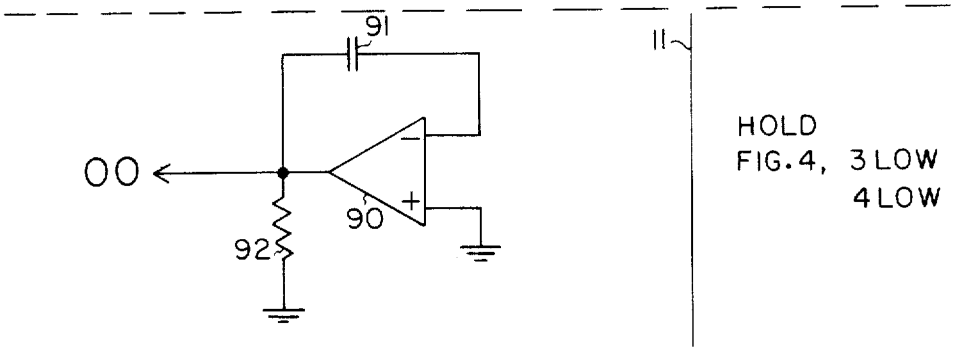

FIGS. 6*c*–*g* illustrate possible configurations for an analog output circuit of FIG. 4 (and by analogy for the corresponding circuits of FIG. 5). FIG. 6*c* illustrates 00, a hold configuration which simply provides an output signal with the storage capacitor 91 being positioned between the negative input of operational amplifier 90 and its output. Resistor 92 maintains a standard load on the operational amplifier. This configuration is obtained by writing onto an analog output card 418 (as shown in FIG. 4) with data lines 3 and 4 low.

Figure 6D:
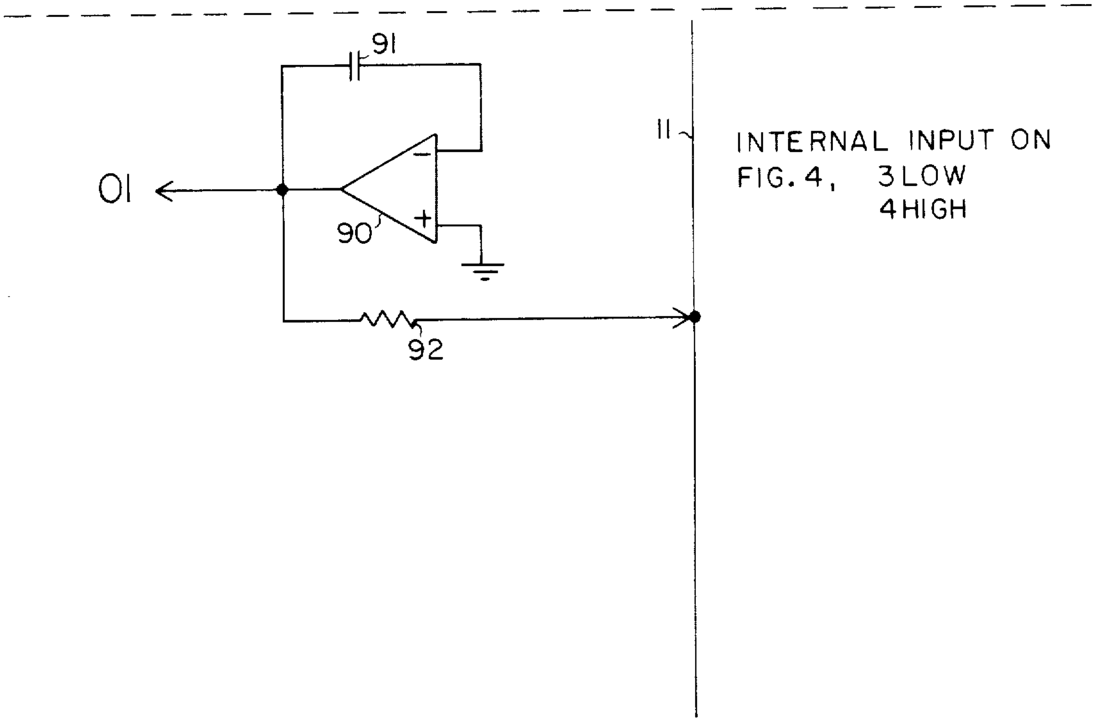

As illustrated in FIG. 6*d*, configuration 01 is a condition with the internal input on. In the circuit of the preferred embodiment, there are situations where an analog value at an output is desired to be read into the single analog bus. This configuration is obtained by writing onto an analog output card 418 (as shown in FIG. 4) with data line 3 low and data line 4 high.

Figure 6E:
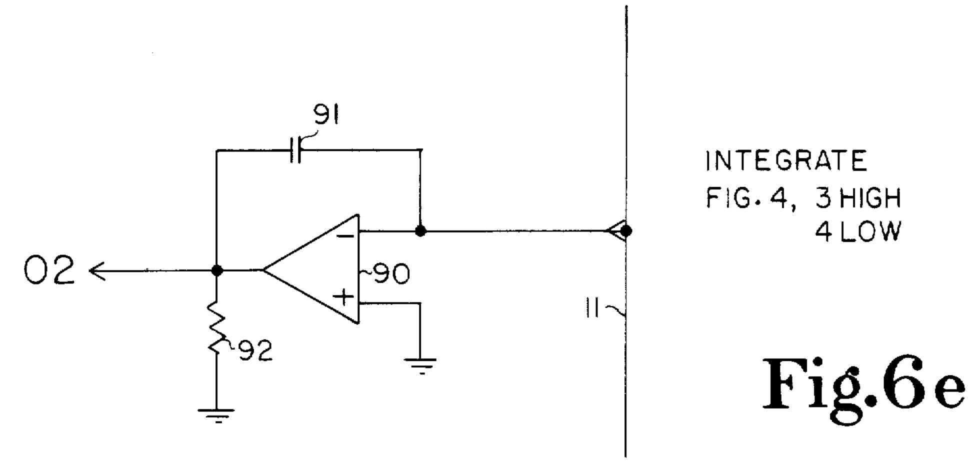
FIG. 6*e*–*g* illustrates in abbreviated form three more of the resultant connections (integrate, amplify-first mode, and amplify-second mode) achieved with the output card of FIG. 4.

Referring more particularly to FIG. 6e, the integrate configuration 02 is obtained by writing onto an analog output card 418 (as shown in FIG. 4) with data line 3 high and data line 4 low.

Figure 6F:
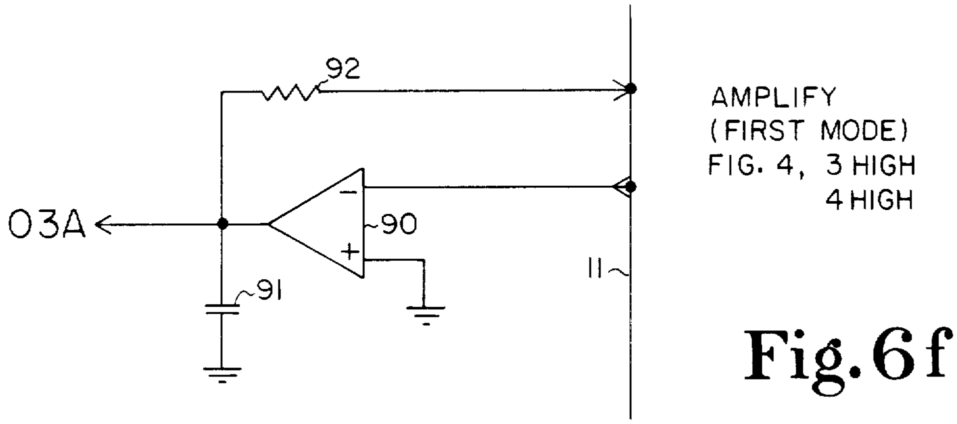
Figure 6G:
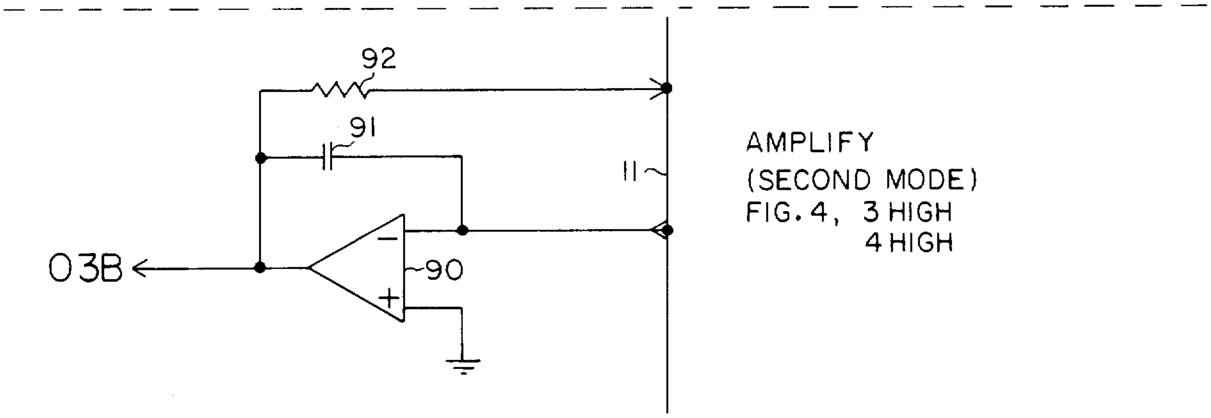

Referring more particularly to FIG. 6*f*, configuration 03A is the configuration which occurs in the first mode of the amplify configuration. Initially, operational amplifier 90 acts merely as an amplifier whose value is stored on capacitor 91 as well as being presented at the output. Configuration 03B is the second mode of amplify in which the capacitor position after reaching approximately the correct value is transferred in its connections from ground to the negative input. This second mode is accomplished at this time so that later disconnection of the negative input of operational amplifier 90 from the analog signal bus 11 does not change the value of the stored analog signal. Configurations 03A and 03B are obtained automatically and sequentially by writing onto an analog output card 418 (as shown in FIG. 4) with data lines 3 and 4 high.

Figure 6H:
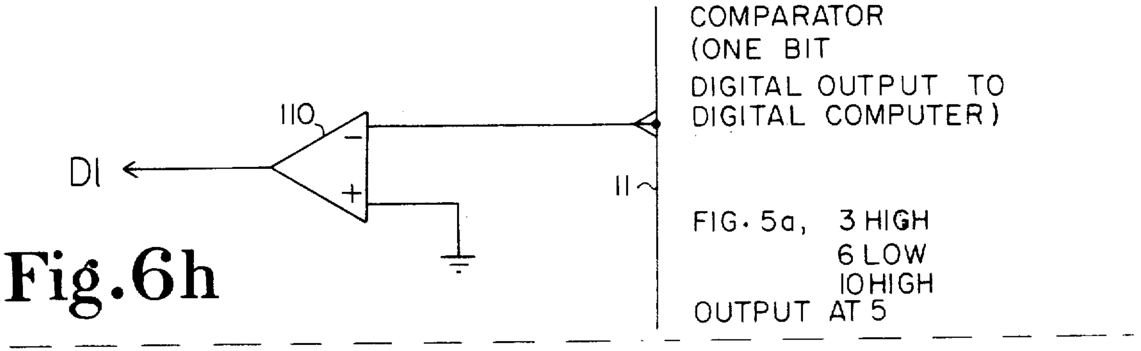
FIG. 6*h*–*j* illustrates in abbreviated form three of the resultant connections (comparator, positive reference, and negative reference) achieved with the analog function card of FIG. 5.

Referring more particularly to FIG. 6*h*, the comparator configuration DI is obtained by writing onto the analog function card 500 (as shown in FIG. 5) with data lines 3 and 10 high and data line 6 low. This configuration provides a 1 bit digital output to the digital computer on line 5 of the 8 bit data bus. This comparator circuit will determine whether or not one analog value is greater than another. Most often in industrial processes, there is no need to convert to digital form to make a comparison.

Figure 6I:
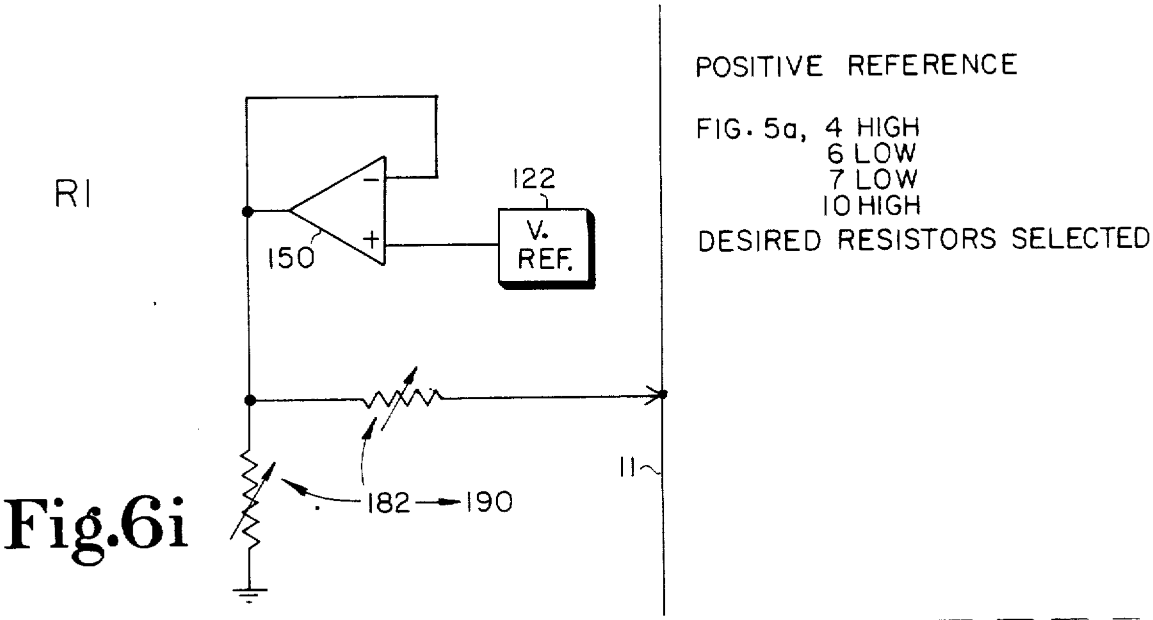
Figure 6J:
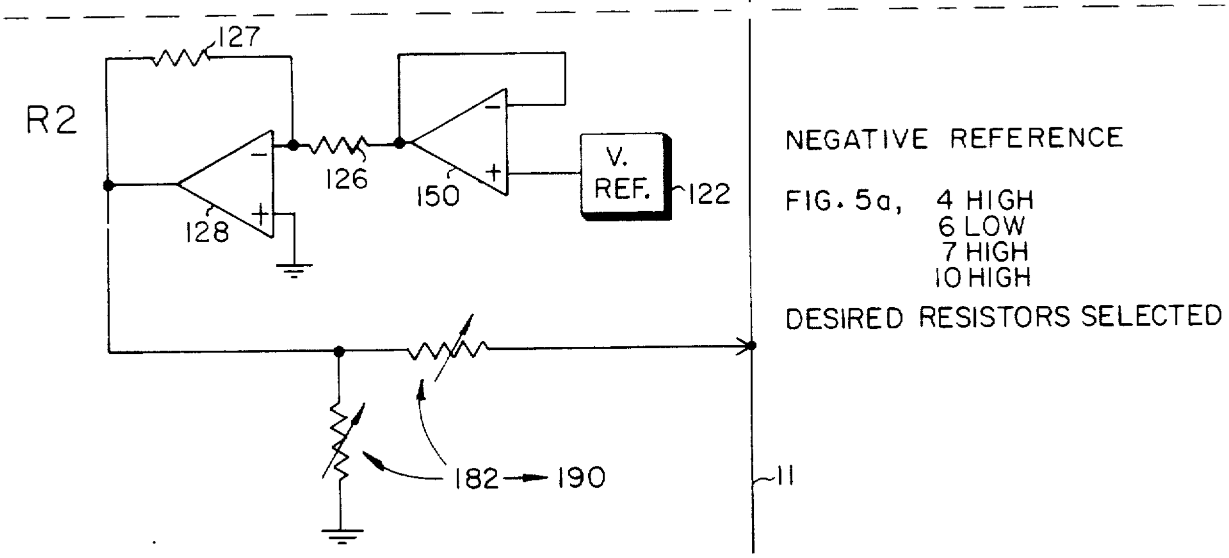

Referring more particularly to FIG. 6*i*, the positive reference configuration R1 is obtained by writing onto the analog function card 500 (as shown in FIG. 5*a*) with data lines 4 and 10 high and data lines 6 and 7 low. Configuration R1 provides a positive reference value which may be used in connection with the comparator or as an analog value offset. Referring more particularly to FIG. 6*j*, the negative reference configuration R2 is obtained by writing onto the analog function card 500 (as shown in FIG. 5*a*) with data lines 4, 7 and 10 high and data line 6 low. Configuration R2 is a negative reference configuration which can be used in a similar fashion to R1. The value of the positive and negative reference are adjustable digitally by selection of appropriate resistors 182 through 190.

In connection with FIGS. 6*c*–*g*, resistor 92 of FIG. 4 was illustrated to show the conventional output circuit. All of the functions 00, 01, 02, 03A and 03B can also be performed equally well with the circuitry of the analog function circuit of FIG. 5*a*, but without external output. Additionally, the value of resistor 92 can be replaced by the digitally selected values of resistor network 181 providing variable amplifier gain.

Figure 7:
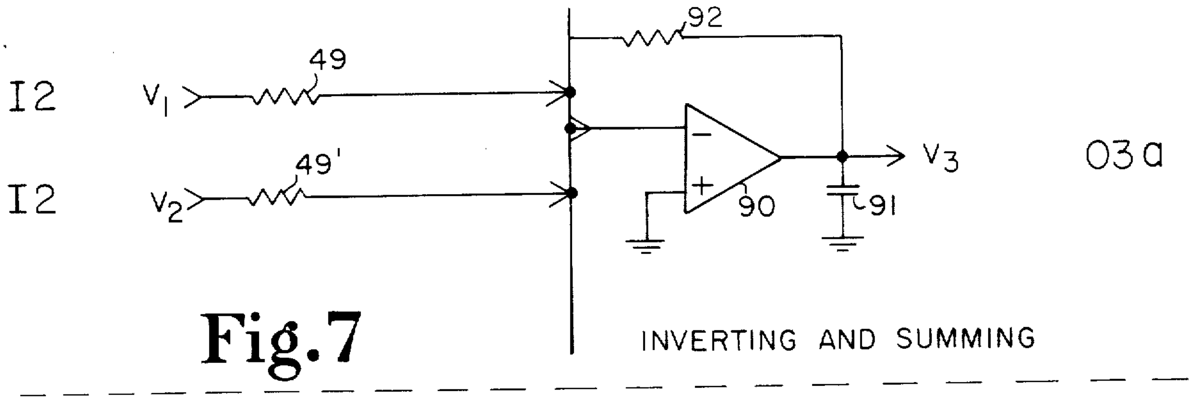
FIG. 7 illustrates an analog inverting and summing operation using two external inputs on from FIG. 6*b* and one amplify-first mode from FIG. 6*f*.
Figure 8:
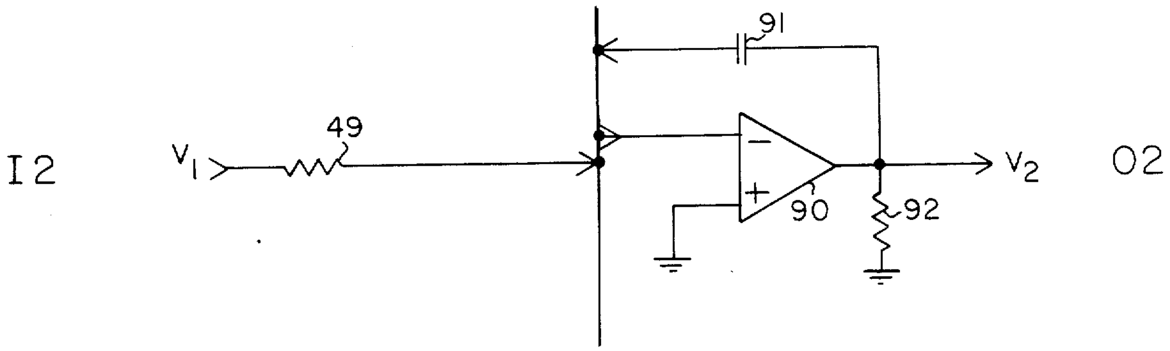
FIG. 8 illustrates an analog integrating circuit operation using one external input on from FIG. 6*b* and one integrate from FIG. 6*e*.

In FIGS. 7 through 11*e*, combinations of the basic configurations of FIGS. 6*a*–*j* are set forth. In FIG. 7, two external inputs are turned on and an output circuit has just been connected in the amplify configuration. This combination results in an inverting and summing operation from two inputs, V1 and V2, to produce an inverted and summed output V3. FIG. 8 sets forth a configuration where an external input has been turned on and an output circuit has been connected in an integrate configuration. These two combined configurations will result in an output at V2 which is an inverted value of the integral of V1. In integration and in differentiation, the time that the circuit remains connected to the analog bus affects the value produced at the output. Since the preferred embodiment of this invention envisions only a single analog bus to handle all analog processing, the digital computer is programmed to allow integration and differentiation for brief periods of time over regularly spaced intervals. The duty cycle of these rate related functions is rather small, but the values of the capacitor and scaling resistors are chosen so that the end result integrated value is not measurably different than what could be obtained if the integration were allowed to proceed continuously. The timing and duration of the rate sensitive calculations can be accomplished either automatically as an inherent function of the position in the sequence of statements which are being executed by the controlling computer, or may be regularly controlled by timing circuits which insure a periodic sampling for a consistent amount of time.

Figure 9:
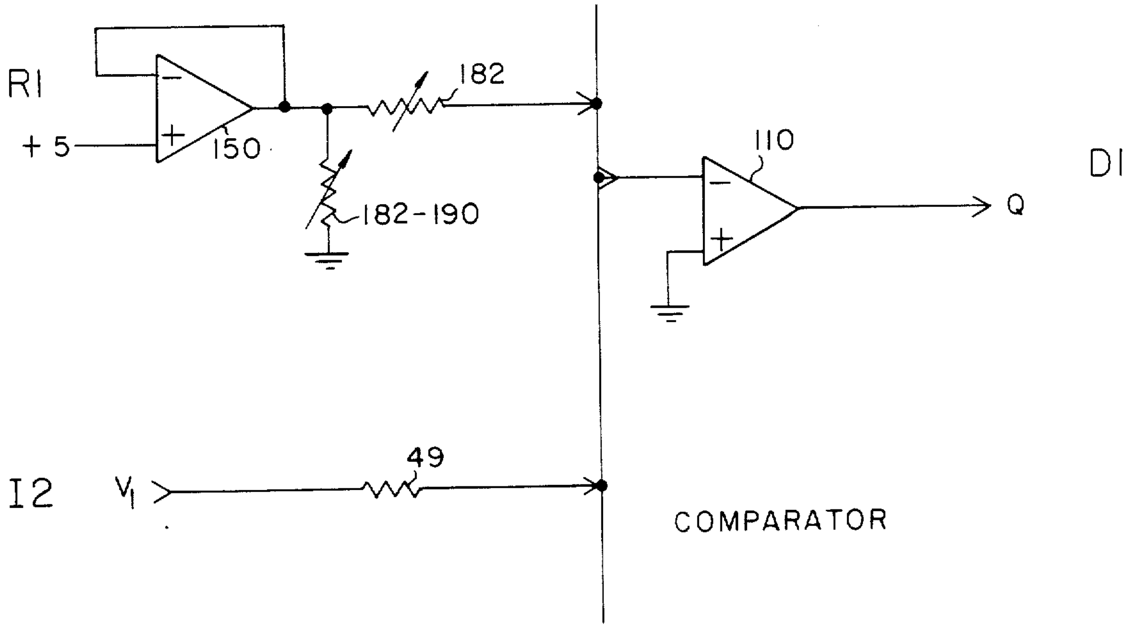
FIG. 9 illustrates an analog comparator operation using one external input on from FIG. 6*b*, one positive reference from FIG. 6*i*, and one comparator from FIG. 6*h*.

Referring to FIG. 9, there is illustrated a comparator circuit which compares the value of an externally connected input V1 to see if it is above or below a threshold value which is obtained from configuration R1. The value of this threshold is, of course, easily set by the appropriate selection of the resistors in the resistor ladder network 181. The output of the comparator Q will be digital in form and connects to the digital computer.

A more complex circuit is set forth in FIG. 10. As shown in FIG. 10, this circuit for differentiation cannot be simultaneously operated using the single analog bus which the preferred embodiment uses. The output V2 of the differentiator is a value which corresponds to the differentiation of the input V1. FIG. 10 represents the end result which occurs from repeating a sequence of five steps shown in FIGS. 11*a*–11*e* a series of times. As can be observed by the use of the same item number on different resistors, the same resistor functions differently at different times in the sequence. To illustrate the difference, a prime has been used beside the second use of a resistor even though in actual operation, the resistor would be the same resistor. Capacitors 91*a* and 91*b* are put in the circuit in dotted configuration, since their only function is to store values which allow the time sequential operation to occur. They would not be necessary for the differentiation to occur in this circuit if the circuit were configured to operate in a simultaneous fashion.

The V1 signal from the external input couples through resistor 49 to the negative input of operational amplifier 90*a*. Also connecting to this negative input is resistor 92*c* which provides a signal from the output of operational amplifier 90*c*. A feedback resistor 92*a* connects from the output of operational amplifier 90*a* to the negative input. The output of operational amplifier 90*a* provides the differentiated output at V2. To achieve the differentiation, the value of this output couples to the negative input of operational amplifier 90*b* through resistor 92*a*'. A feedback resistor 92*b* connects from the output of operational amplifier 90*b* to the negative input. This amplifier provides a signal inversion at unity gain. The output then couples through resistor 92*b*' to the negative input of operational amplifier 90*c*. Capacitor 91*c* couples from the output of amplifier 90*c* to the negative input to achieve integration of the signal. This integrated signal is then subtracted from the incoming signal by its coupling through resistor 92*c* to the negative input of operational amplifier 90*a*. That's how the circuit appears to work in composite form. To view how the circuit works in the time sequential form which actually takes place with the preferred embodiment, reference should first be made to FIG. 11*a*. Just as above, the output of the integrator is summed with the external input V1. This value is then amplified and produced at the output V2. The value of the amplified signal is initially stored on capacitor 91*a* in its connection to ground.

Figure 11C:
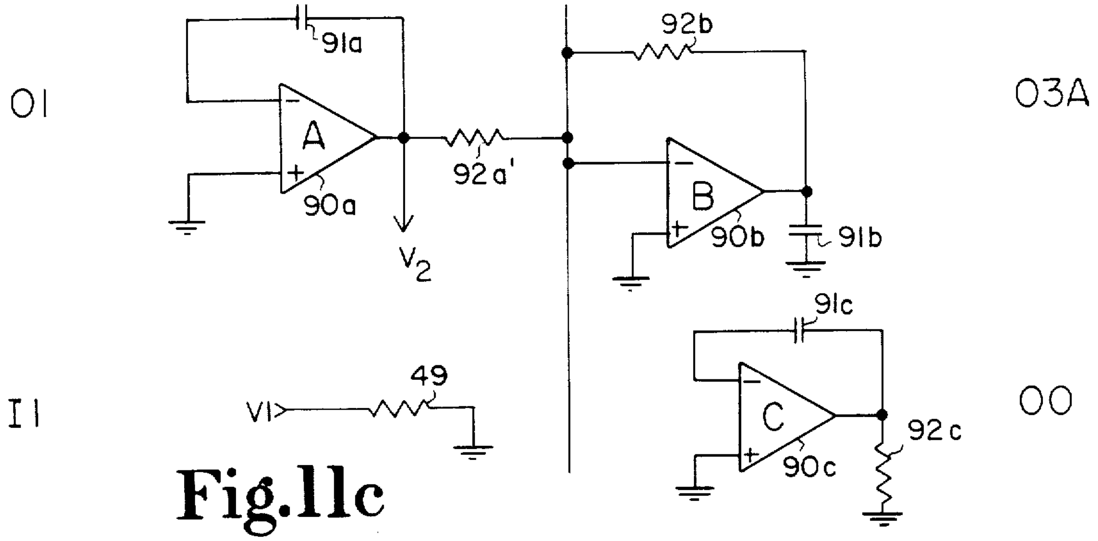

Referring more particularly to FIG. 11*b*, the only change in the configuration is for capacitor 91*a* to change its connection from being connected to ground to being connected to the negative input of amplifier 90*a*. This provides a more accurate value to be stored on the capacitor and minimizes the error caused in the disconnection of the negative input from the data bus which will occur in the next step. As can be observed in FIG. 11*c*, the negative input of operational amplifier 90*a* has been removed from the data bus as has the external input resistor. Resistor 92*a* remained connected and is designated as 92*a*' to correspond with the FIG. 10 designation. Operational amplifier 90*c* was disconnected from the bus and placed in a hold configuration to preserve whatever interim value it had achieved in its integrated signal. Operational amplifier 90*b* is in the first step of the amplify mode and is functioning merely to achieve an inverted level signal.

Figure 11D:
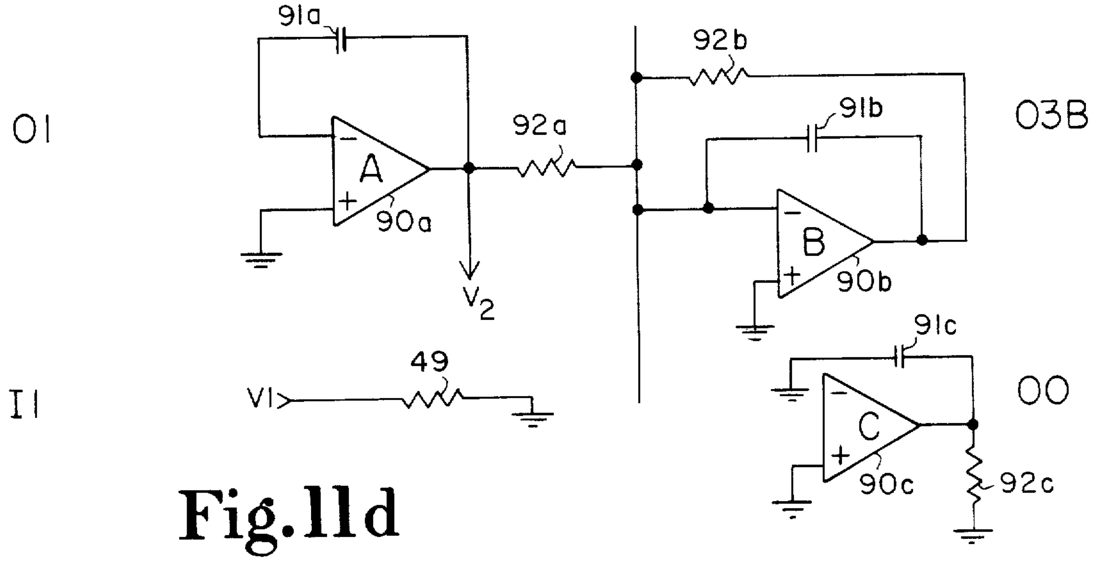

Referring now to FIG. 11*d*, the same situation appears except that capacitor 91*b* has changed its position in its second portion of the amplify mode of amplifier 90*b*.

Figure 11E:
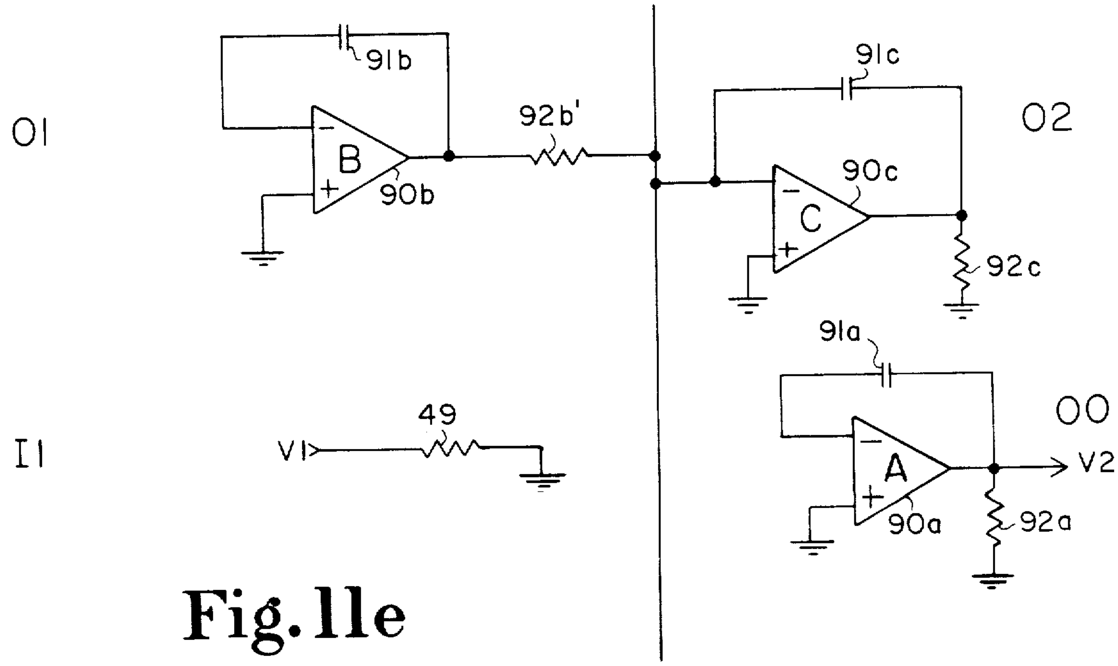

Referring to FIG. 11*e*, amplifier 90*b* has changed its configuration from the amplify arrangement to the internal input "on" configuration so that the inverted value which it generated can be applied back to the single analog bus through its resistor 92*b*'. This signal is then used to continue the integration process of operational amplifier 90*c*. While this is occurring, amplifier 90*a* is in a hold configuration to maintain the previous value of the output available for any external devices which are sampling the differentiated value.

After the configuration in 11*e*, all the involved operational amplifiers are placed in hold mode, and the analog computer does other processing. After a fixed time period, the circuit reverts back again to the configuration in 11*a* and continues the sequence again. After several cycles through these configurations, a very accurate value of a differentiated output is achieved.

Because the programmable controller which controls the connections of the analog circuit components works very rapidly in real time, the analog computer can function to the external world as though all of its components were permanently connected in various configurations, notwithstanding the fact that all of these configurations are constantly changing at a very rapid rate. The net result is a general purpose analog computer which can be infinitely versatile in its applications, exceedingly fast in its operation, exceedingly simple in its design, and highly reliable in view of the very few number of components which are present. The fact that each of the operational amplifiers has the ability not only to receive data from the single analog bus, but also to output its value retained in its memory back to that very same bus with extremely efficient digital commands provides for very rapid operation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hybrid digital and analog computer comprising:
a. a hybrid computer having several interface locations each suitable for insertion of an interface module and each of said interface locations having connections for
(1) common multibit data bus
(2) common anlog signal bus
(3) common read and/or write signal bus
(4) common supply voltage
(5) common ground
(6) card enable address line
(7) multiple external lines for connection to external devices:
b. means for permitting either of the following to be operationally inserted into any one of said several interface locations without rewiring being necessary:
(1) a digital data interface module for controlling connections between the computer and external devices, or
(2) an analog data interface module for controlling connections between the computer and external devices.

2. The hybrid computer of claim 1 which additionally includes a common analog ground connection in each of said several interface locations.

3. The hybrid computer of claim 1 in which there are at least eight interface locations.

4. The hybrid digital and analog computer of claim 1 which additionally includes an analog data input card as said analog data interface module and a digital data input card as said digital data interface module.

5. The hybrid digital and analog computer of claim 1 which additionally includes an analog data output card as said analog data interface module and a digital data output card as said digital data interface module.

6. The hybrid digital and analog computer of claim 1 which additionally includes:
(a) digital data input card,
(b) analog data input card,
(c) digital data output card, and
(d) analog data output card
as said analog and digital data interface modules.

7. The hybrid digital and analog computer of claim 6 which additionally includes said analog and digital data input and output cards in said locations, all having common pin connections for the common multibit digital data bus.

8. The hybrid digital and analog computer of claim 7 in which there are at least eight interface locations.

9. The hybrid digital and analog computer of claim 6 which additionally includes a common analog ground connection in each of said several interface locations.

10. An analog computer comprising:
a. an analog bus;
b. several analog input circuits with means for digital control of connections of external inputs to said analog bus;
c. several analog output circuits with means for digital control of the connection of the inputs to said analog output circuits to said analog bus;
d. means for placing each of said several analog output circuits in a read state, in which read state:
(1) the input to said analog output circuit connects to said analog bus, and
(2) said analog output circuit has a mode in which the output of said analog output circuit has a value corresponding to the value of the input to said analog input circuit;
e. means for placing each of said several analog output circuits in a memory state, in which memory state:
(1) the input to said analog output circuit does not connect to said analog bus, and
(2) the output of said analog output circuit holds and maintains the value of the output in a preceding read state, and
(3) the output of said analog output circuit can be selectively coupled back to said analog bus to provide an internal input tofhe analog bus corresponding to the value of the output in a preceding read state; and
f. a digital computer means for controlling said means for digital control in said several analog input circuits and in said several analog output circuits.

11. The analog computer of claim 10 in which said analog bus is a common summing node.

12. The analog computer of claim 11 which additionally includes means for placing said analog output circuit in an integrate mode when said analog output circuit is in said read state, in which integrate mode the rate of change of the value of the output of said analog output circuit corresponds to the rate of change of the value of the input to said analog output circuit.

13. The analog computer of claim 11 in which said analog output circuits each include:
a. an operational amplifier;
b. a capacitor connected between the output of said operational amplifier and ground during the first portion of said read state, and including means for automatically changing that connection so that the output of said operational amplifier is connected to the negative input of said operational amplifier a period time after the output circuit is placed in the read state.

14. The analog computer of claim 11 in which said digital computer means is a programmable logic controller.

15. The analog computer of claim 10 which additionally includes:
a. a circuit ground; and
b. a separate common analog ground;
c. individual ground inputs associated with each of said several analog input circuits with means for digital control of the connection of said ground input to said common analog ground;
d. several analog ground output circuits associated with each of said several analog output circuits with means for selective digital control of the connection of the grounds for said analog output circuits to said common analog ground or to said circuit ground;
e. said several analog ground output circuits each including
(1) means operable in said read state for connecting the ground for said output circiut to said common analog ground, and
(2) means operable in said memory state for connecting the ground for said output circuit to said circuit ground, and for selectively coupling back the ground of said output circuit to said analog bus to provide an internal ground to said analog bus; and
f. said digital computer means also including means for controlling said means for digital control of the connection of the grounds in said several analog input circuits and in said several analog output circuits.

16. The analog computer of claim 10 which additionally includes an analog function circuit which comprises:

(a) a first resistance having a first end and a second end and formed by a resistor ladder network including:

(1) a group of several resistors; and (2) a group of several digital switches, there being one digital switch connecting to each of said resistors;

(b) a processing circuit which includes means for placing said processing circuit in a read state, in which read state:

(1) the input to said processing circuit connects to said analog bus; and (2) said processing circuit has a mode in which the output of said processing circuit has a value corresponding to the value of the input to said processing circuit; and means for placing said processing circuit in a memory state, in which memory state:

the output of said output circuit can be selectively coupled back to said analog bus through said first resistance to provide an internal input to the analog bus, the internal input having a value corresponding to the value of the output of said output circuit in a preceding read state;

(c) means in said digital computer means for controlling said several digital switches associated with said several resistors and for controlling the selection of the stae of said processing circuit.

17. The analog computer of claim 16 in which said analog function circuit additionally comprises:

(a) a voltage reference, (b) a digitally selectable inverter to provide either normal or inverted polarity of an analog signal, (c) means in said digital computer means for controlling the connection of said voltage reference through said inverter and said several digital resistors to the analog bus, (d) said processing circuit also including means for placing said processing circuit in a comparator state, in which comparator state:

(1) said processing circuit has a reference input connected to ground, an input connected to the analog bus, and an output connected to said digital computer, and (2) said means for placing in a comparator state includes digital switches for making each of the input and output connections to said processing circuit, and (e) means in said digital computer means for controlling the digital switches associated with the comparator state of said processing circuit.

18. A time division multiplexed single bus analog computer comprising:

a. a summing point;

b. digital computer having (1) a memory with digital computer instructions and digital analog-control registers, and (2) an input from the output of a comparator, said comparator having an input connectable to said summing point;

c. an analog input selectably connectable through a resistance to said summing point;

d. inverting analog memory means with an input coupling to said summing point and an output coupling through a resistance to said summing point for inverting in value a signal earlier stored into said inverting analog memory means from said summing point and for coupling said inverted signal to said summing point:

e. an operational amplifier means, including means for providing feedback to said summing point which can be varied as to rate or amplitude;

f. several analog memory means for storing analog values, each loaded from the output of said operational amplifier means, and means for applying the analog values from any of said several analog memory means through a resistance to said summing point;

g. a reference voltage and means for coupling said reference voltage through a resistance to said summing point;

h. weighted resistor ladder being digitally connectable between said summing point and the output of said operational amplifier means;

i. means for providing an analog output from at least one of said several analog memory means; and j. means in said digital computer for digitally controlling current:

(1) from each resistor of said weighted resistor ladder to said summing point, (2) from the analog input to said summing point, (3) from the input and output of said inverting analog memory means to said summing point.

(4) from the input to said operational amplifier means to said summing point, (5) from the outputs of said operational amplifier means to said several analog memory means, and (6) from the outputs of said several analog memory means to said summing point, in response to the contents of the digital analog-control registers.

19. The time divisiom multiplexed single bus analog computer of claim 18 in which all of said operational amplifier means have input circuits including field effect transistors.

20. The time division multiplexed single bus analog computer of claim 19 in which all of said operational amplifiers are CMOS operational amplifiers.

21. The time division multiplexed single bus analog computer of claim 19 in which said operational amplifier means includes at least eight operational amplifiers, each with means for providing feedback to said summing node which can be varied as to rate or amplitude and each for providing an analog output.

22. A combination of a programmable logic controller with analog circuitry comprising:

a. a programmable logic controller having one bit Boolean logic instructions which instructions include an "AND" or "OR" instruction for use with a one bit accumulator, said controller having input and output address lines and a data bus;

b. a summation point;

c. analog input means which may be enabled or disabled and which is for coupling an analog data source to said summation point;

d. a digital to analog converter having its output connectable to said summation point;

e. first means which may be enabled or disabled and which is for coupling the input of said digital to analog converter to several bits of the data bus of said programmable logic controller;

f. a multibit data latch having its output connected to the input of said digital to analog converter;

g. second means which may be enabled or disabled and which is for coupling several bits of the data bus to the inputs of said multibit data latch;

h. a comparator having one input connectable to said summation point and including means for permitting the output as said comparator to be read in one-bit binary by said programmable controller;

i. a sample and hold circuit having its analog input controllably connectable to said summation point; and j. analog output means which is for coupling the output of said sample and hold circuit to an analog output device.

23. The combination of claim 22 in which said data bus is a multibit data bus with at least eight bidirectional data lines.

24. The combination of claim 22 which additionally includes a second analog input means which may be enabled or disabled and which is for coupling a second analog data source to said summation point.

25. The combination of claim 22 which additionally includes a. a second sample and hold circuit having its analog input connected to said summation point and b. a second analog output means which is for coupling the output of said sample and hold circuit to an analog output device.

26. The combination of claim 22 in which said first and second means are analog switches made of field effect transistors.

27. The combination of claim 23 in which said first and second means are analog switches made of field effect transistors.

28. The combination of claim 27 which additionally includes a second analog input means which may be enabled or disabled and which is for coupling a second analog data source to said summation point.

29. The combination of claim 28 which additionally includes a. a second sample and hold circuit having its analog input connected to said summation point and b. a second analog output means which is for coupling the output of said sample and hold circuit to an analog output device.

* * * * *

UNITED STATES PATENT AND TRADEMARK OFFICE

CERTIFICATE OF CORRECTION

PATENT NO. : 4,499,549

DATED : February 12, 1985

INVENTOR(S) : Peter G. Bartlett

It is certified that error appears in the above-identified patent and that said Letters Patent is hereby corrected as shown below:

In column 14, line 13, "tofhe" should read "to the"
In column 16, line 7, ":" should read ";"
In column 16, line 31, "." should read ","
In column 16, line 40, "divisiom" should read "division"
In column 17, line 10, "as" should read "of"

Signed and Sealed this

*Eighteenth* Day of *June 1985*

[SEAL]

*Attest:*

DONALD J. QUIGG

*Attesting Officer* *Acting Commissioner of Patents and Trademarks*